(12) United States Patent
Messerly et al.

(10) Patent No.: US 9,110,743 B2
(45) Date of Patent: Aug. 18, 2015

(54) EXTENSIBLE SYSTEM ACTION FOR SHARING WHILE REMAINING IN CONTEXT

(75) Inventors: Katie Messerly, Bothell, WA (US); Christopher Clark, Seattle, WA (US); Feng Zhao, Bellevue, WA (US); Ahsan Kabir, Seattle, WA (US); Olivier Tritschler, Lake Forest Park, WA (US); Jesse Clay Satterfield, Seattle, WA (US); Ginger Gloystein, Seattle, WA (US); Billie Sue Chafins, Seattle, WA (US); Patrik Lundberg, Lake Forest Park, WA (US); Sashi Raghupathy, Redmond, WA (US); Manoj Biswas, Bellevue, WA (US); Devang Thakker, Seattle, WA (US); Jensen Harris, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 209 days.

(21) Appl. No.: 12/974,028

(22) Filed: Dec. 21, 2010

(65) Prior Publication Data
US 2012/0159334 A1 Jun. 21, 2012

(51) Int. Cl.
*G06F 9/54* (2006.01)

(52) U.S. Cl.
CPC ..................................... *G06F 9/543* (2013.01)

(58) Field of Classification Search
CPC ..... G06F 3/0484; G06F 3/048; G06F 3/0481; G06F 3/0482; G06F 3/04817; G06F 3/01; G06F 17/3028; G06F 17/30165; H04L 65/4015
USPC .......................................... 715/733; 709/205
See application file for complete search history.

(56) References Cited

U.S. PATENT DOCUMENTS

| | | | | |
|---|---|---|---|---|
| 5,862,377 A | * | 1/1999 | Lee ............................... | 719/329 |
| 5,956,036 A | * | 9/1999 | Glaser et al. .................. | 715/853 |
| 7,284,203 B1 | | 10/2007 | Meeks et al. | |
| 7,665,028 B2 | | 2/2010 | Cummins et al. | |

(Continued)

OTHER PUBLICATIONS

"International Search Report and Written Opinion", Mailed Date: Sep. 3, 2012, in corresponding PCT Application No. PCT/US2011/065703, pp. 1-10.

(Continued)

*Primary Examiner* — Shen Shiau
(74) *Attorney, Agent, or Firm* — Aaron Chatterjee; Kate Drakos; Micky Minhas (57) ABSTRACT

An operating system provides an extensible share action to broker content sharing between applications executing on a computing platform such as a personal computer, tablet computer, or smartphone. The share action enables a consistent user experience for content sharing to be implemented across all applications and eliminates users having to switch from the current application they are using to some other functionality in order to share content. Applications can participate with the operating system share action as source applications and/or target applications. Source applications may describe what content is shareable given the current state of their application when the user chooses to invoke the share action. Target applications can be configured to receive the shared content from the source application according to content type, and will expose a companion view of their application to the user that is specifically tailored to facilitate sharing.

20 Claims, 11 Drawing Sheets

(56) References Cited

U.S. PATENT DOCUMENTS

| | | |
|---|---|---|
| 8,117,277 B2 * | 2/2012 | Nikiel et al. ............... 709/217 |
| 2004/0015539 A1 * | 1/2004 | Alegria et al. ............... 709/203 |
| 2004/0193621 A1 | 9/2004 | Moore et al. |
| 2005/0086309 A1 | 4/2005 | Galli et al. |
| 2005/0108456 A1 * | 5/2005 | Boutcher et al. ............. 710/240 |
| 2005/0246588 A1 * | 11/2005 | Deng et al. .................. 714/38 |
| 2006/0123010 A1 * | 6/2006 | Landry et al. ................ 707/10 |
| 2006/0156308 A1 * | 7/2006 | Jarvis et al. ................. 718/104 |
| 2006/0206587 A1 * | 9/2006 | Fabbrocino .................. 709/219 |
| 2006/0248122 A1 * | 11/2006 | Nikiel et al. ................ 707/200 |
| 2007/0067726 A1 | 3/2007 | Flynt et al. |
| 2007/0157104 A1 * | 7/2007 | Blain et al. .................. 715/771 |
| 2008/0027909 A1 | 1/2008 | Gang et al. |
| 2008/0077867 A1 * | 3/2008 | Hake et al. .................. 715/730 |
| 2008/0098327 A1 * | 4/2008 | Berkovitz et al. ............ 715/803 |
| 2009/0037517 A1 * | 2/2009 | Frei .......................... 709/202 |
| 2009/0157741 A1 | 6/2009 | Cheng et al. |
| 2009/0164475 A1 * | 6/2009 | Pottenger ..................... 707/10 |
| 2009/0234876 A1 | 9/2009 | Schigel et al. |
| 2009/0328041 A1 * | 12/2009 | Sudzilouski ................. 718/100 |
| 2010/0049788 A1 * | 2/2010 | Bandaru et al. .............. 709/203 |
| 2010/0077336 A1 | 3/2010 | Ording et al. |
| 2012/0179522 A1 * | 7/2012 | Adachi et al. ............... 705/14.4 |
| 2012/0209946 A1 * | 8/2012 | McClure et al. ............. 709/217 |

OTHER PUBLICATIONS

Williams, Stephen A., "Using SoftBench to Integrate Heterogeneous Software Development Environments", Retrieved at << http://www.hpl.hp.com/hpjournal/97feb/feb97a5.pdf >>, Feb. 1997, pp. 1-7.

CN First Office Action for Application No. 201110432288.6, Feb. 13, 2014.

CN Second Office Action, for Application No. 201110432288.6, Nov. 2, 2014.

CN Third Office Action for Application No. 201110432288.6, Feb. 28, 2015.

* cited by examiner

EXTENSIBLE SYSTEM ACTION FOR SHARING WHILE REMAINING IN CONTEXT

BACKGROUND

Today electronic device users often share content with other users on the web using a variety of different mechanisms including e-mail, social networking sites, instant messaging, photo sharing sites, social bookmarking sites, and blogs, to name a few. However, many operating systems executing on the devices typically do not play a role in facilitating sharing. Instead, for example, users generally have to rely on generic functions like the clipboard to copy and paste content from one application/website to another, or they have to use sharing functionality provided by each individual application/website. Other current content sharing techniques include "drag and drop" to move content from one application/website to another, and use of a file manager/browser application such as Microsoft Corporation's Windows® Explorer which exposes extensibility points as COM (common object model) interfaces to enable sharing. Some web browser plug-ins can also currently facilitate content sharing.

Although these current mechanisms function satisfactorily in some cases, they have limitations and are not specifically tailored for content sharing which can often make the user experience when sharing less than ideal. For example, users need to switch from their current application to use the clipboard to share content and applications/websites receiving the content do not specifically enable copy and paste with the clipboard to support sharing. Drag and drop is similarly limited by this lack of specific enablement for content sharing which can result in the user experience being cumbersome and not well streamlined. Using Explorer involves taking steps needed to store content for sharing locally and works only from Explorer and not for any content shown by a Windows application. Browser plug-ins for sharing are similarly limited to working just in the browser and cannot be extended to content shown by a Windows application.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An operating system provides an extensible share action to broker content sharing between applications executing on a computing platform such as a personal computer, tablet computer, or smartphone. The share action enables a consistent user experience for content sharing to be implemented across all applications and eliminates users having to switch from the current application they are using to some other functionality in order to share content. Applications can participate with the operating system share action as source applications and/or target applications. Source applications may describe what content is shareable given the current state of their application when the user chooses to invoke the share action. Target applications can be configured to receive the shared content from the source application according to content type, and will expose a companion view of their application to the user that is specifically tailored to facilitate sharing.

In various illustrative examples, target applications register the content types they can accept and target application developers are responsible for building the specifically tailored companion view of the application that is executed on the platform during content sharing. The user can access the share action by invoking an action space that is available from anywhere (e.g., the desktop, all user interfaces (UIs), and all applications) at any time. The action space provides a consistent entry point to a set of system actions, one of which is the share action. So if a user is looking at a picture using a source application such as a picture viewer, and selects the share action from the action space, a filtered list of target applications that can accept the shareable content by content type (e.g., photographs in this example) is displayed on a share UI. Target applications can include any of a variety of applications such as social networking, e-mail, photo sharing, other communication applications, and the like. The target applications facilitate content sharing with various different sharing endpoints including websites, individuals, multiple people, or categories of people.

When a user selects a target application from the list, the operating system launches the companion view of that application and the user completes his or her share in that application. This interaction means that the source and the target applications do not need to be aware of one another—they can simply participate in the present sharing paradigm by describing shareable content that they can provide as a source application or that they can accept as a target. The operating system acts as the broker for the sharing by passing the content and other information such as content properties and metadata in some cases, from the source to the target application. When the user share action is complete, the target application passes a message to the operating system to close the UI of the companion view. It can also pass back a shortcut that describes the action the user just completed. When the user performs a subsequent share, the shortcut can be presented to the user in the share UI as part of a list of frequently used user-actions. The target application may upload the shared content to the appropriate sharing endpoint, for example as a background process.

Advantageously, the present share action enables users to maintain the context of an interaction with a given application without having to leave what they are doing, start up another application, or open up another tab in a browser, and then perform multiple steps to implement sharing using the current techniques. Utilization of the companion view of the target application further enhances the user experience when sharing by tailoring the UI and functionality to sharing specifically as compared with the sub optimal experience that is commonly experienced when using generic techniques.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements are not drawn to scale unless otherwise indicated.

DETAILED DESCRIPTION

Figure 1:
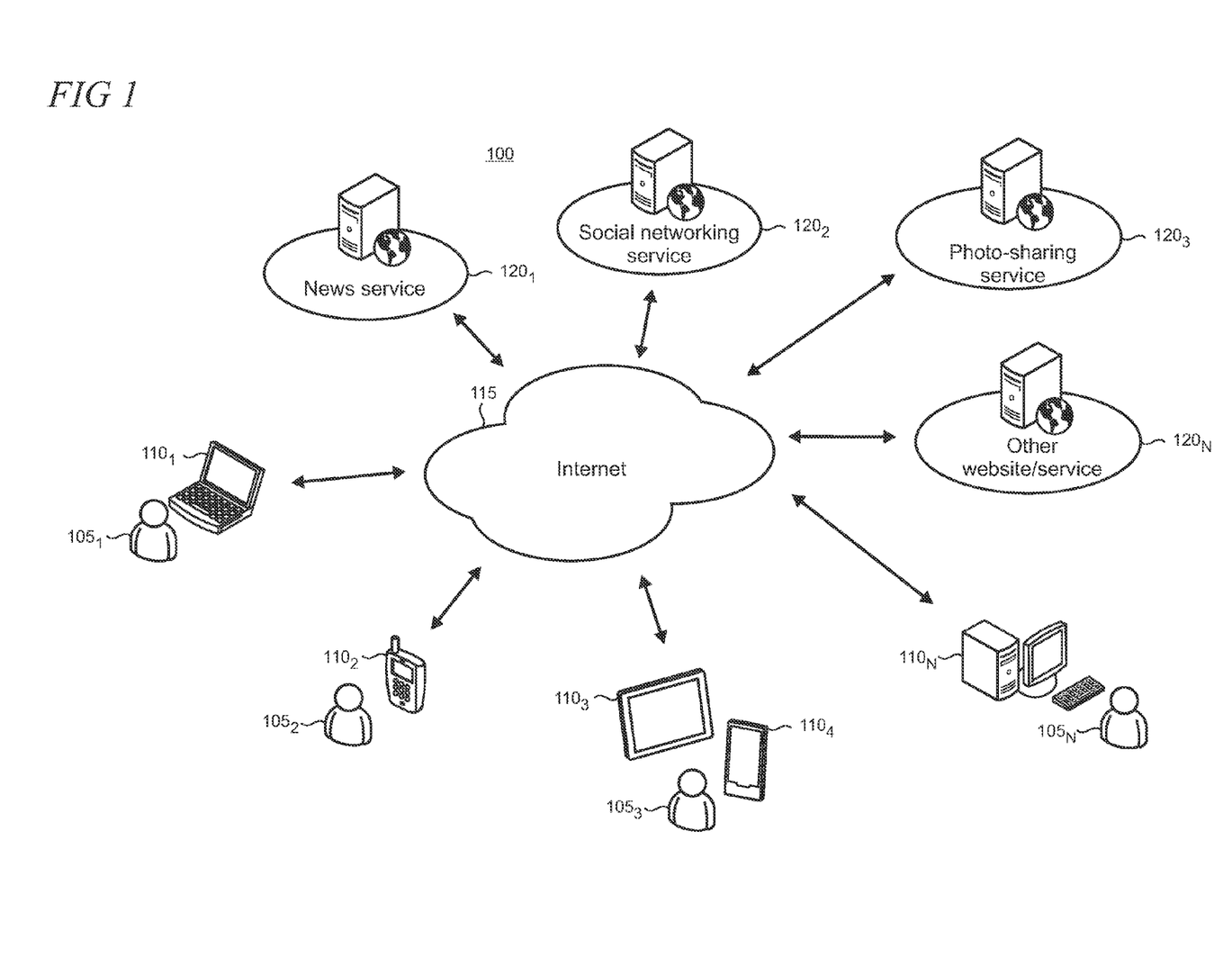
FIG. 1 shows an illustrative computing environment in which the present extensible system action for sharing may be implemented.

FIG. 1 shows an illustrative computing environment 100 in which the present extensible system action for sharing may be implemented that includes a number of users $105_{1, 2 \ldots N}$ interacting with respective computing platforms $110_{1, 2 \ldots N}$. The computing platforms 110 may, in this illustrative example, include any of a variety of devices such as desktop and laptop PCs, game consoles, mobile phones, smart phones, personal e-mail devices, personal media players, personal digital assistants, GPS (Global Positioning System) devices, tablet computers, digital cameras, and the like.

As shown, the users 105 may communicate among each other and interact with various services on the World Wide Web using public network infrastructure such as the Internet 115. The services in this example include a news service $120_1$, a social networking service $120_2$, photo sharing service $120_3$, and various other services or websites as representatively indicated by reference numeral $120_N$.

Figure 2:
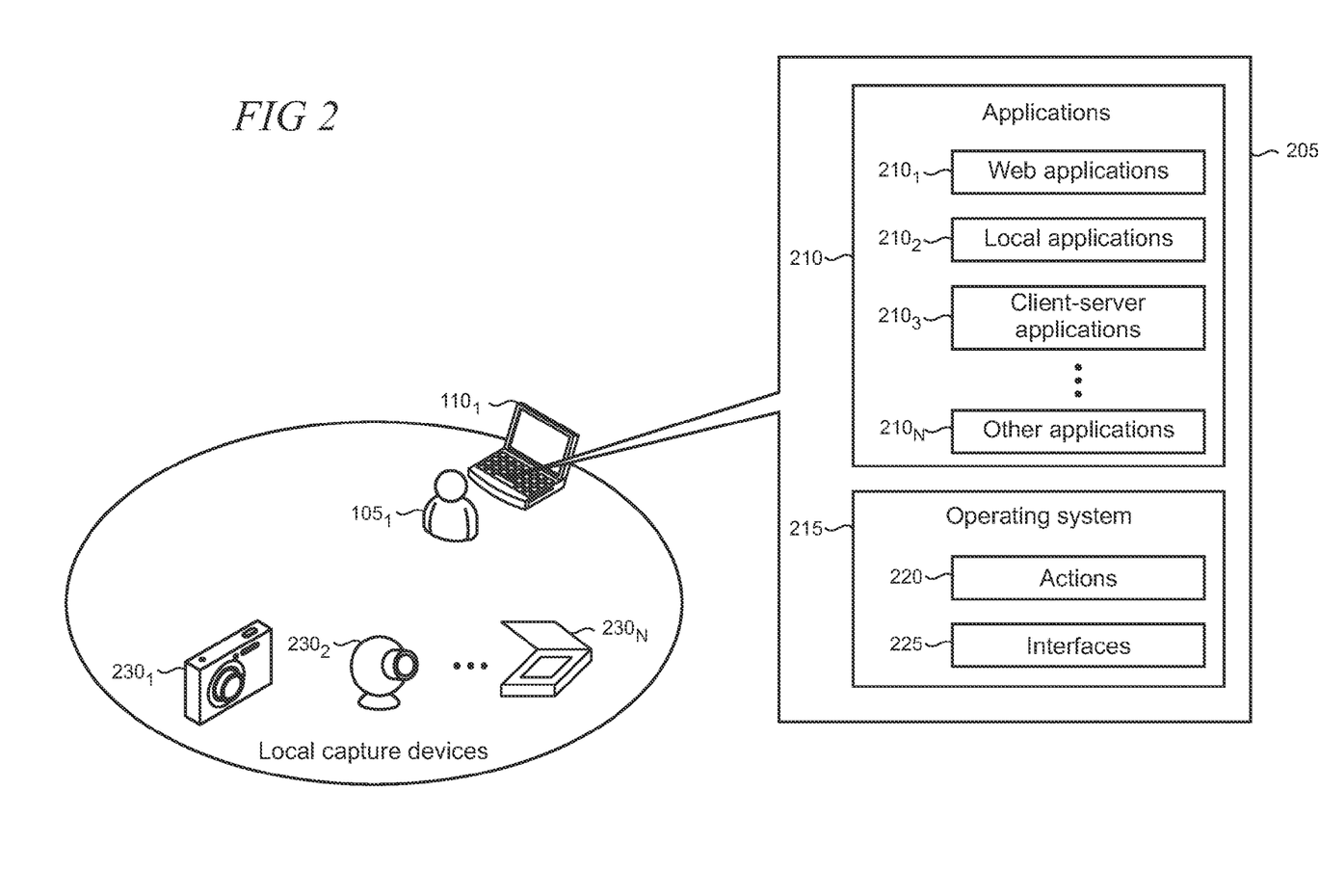
FIG. 2 shows illustrative functional components, typically implemented in software, that may execute on a computing platform as well as local capture devices.

FIG. 2 shows various illustrative functional components 205 that commonly execute on one or more of the computing platforms 110. It is noted that the components shown in FIG. 2 are not intended to be exhaustive and other components may be supported or executed on a given platform as needed to meet the requirements of a particular implementation. In many cases, the components 205 are implemented using code expressed in software instructions that is stored on one or more machine-readable media, however, the components may also be implemented using firmware, hardware, or various combinations or sub-combinations of software, firmware, and hardware. As shown, the components 205 include applications 210 and an operating system 215. The applications 210 illustratively include web applications $210_1$, local applications $210_2$, client-server applications $210_3$, and other applications $210_N$.

The operating system 215 is configured, in this illustrative example, to perform various actions 220 and expose various interfaces 225. The actions 220 are described in more detail in the text accompanying FIG. 3. The interfaces 225 may include, for example, drivers to enable the applications 210 to communicate with local capture devices 230 such as a digital camera $230_1$, a web cam, $230_2$, and a scanner $230_N$.

It is noted that the operating system 215 will not typically be identically configured in each instance of a computing platform 110. In other words, differences in features, functionalities, structures, and methods implemented by the operating system 215, among other differences, can be expected according to the needs of a given platform. However, principles of the present system action for sharing may be adapted to various operating systems. That is, the share action may be readily adapted to a variety of operating systems, computing platforms, usage scenarios, and environments.

Figure 3:
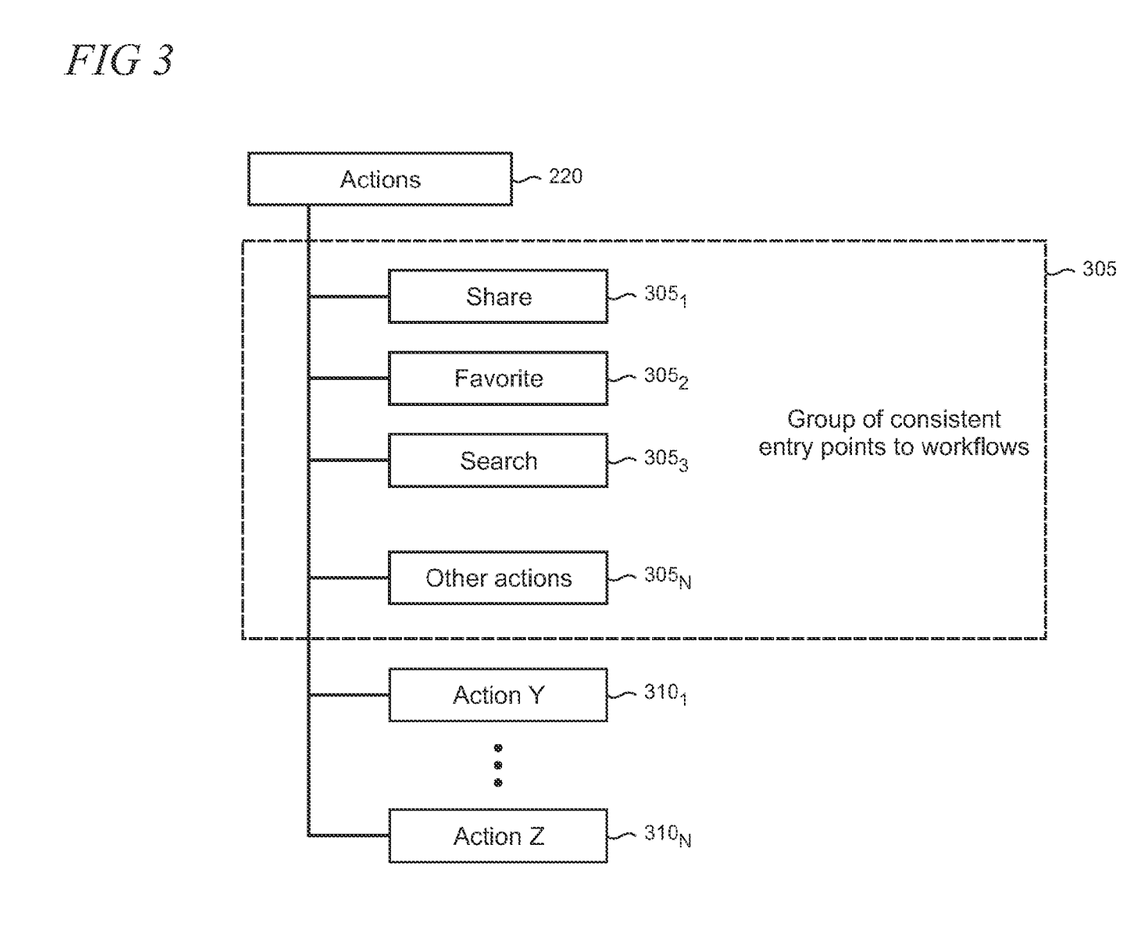
FIG. 3 shows illustrative system actions that may be implemented by an operating system.

FIG. 3 shows a set of illustrative system actions 220 that may be implemented by the operating system 215 (FIG. 2). As shown, some of the system actions 220 are included in a group (i.e., a subset of the system actions 220), as indicated by reference numeral 305, that provides consistent entry points to particular workflows which are exposed to the user 105 via an action space as described in more detail below. These system actions illustratively include share $305_1$, favorite $305_2$, search $305_3$, and other actions $305_N$. These actions respectively facilitate a user to implement sharing; connecting to different devices; searching; and performing other actions. This subset 305 of system actions exposed in the action space may typically be invoked by the user 105 from anywhere on the computer at any time. The operating system 215 will typically implement other actions 310 that are outside the scope of the present disclosure.

Figure 4:
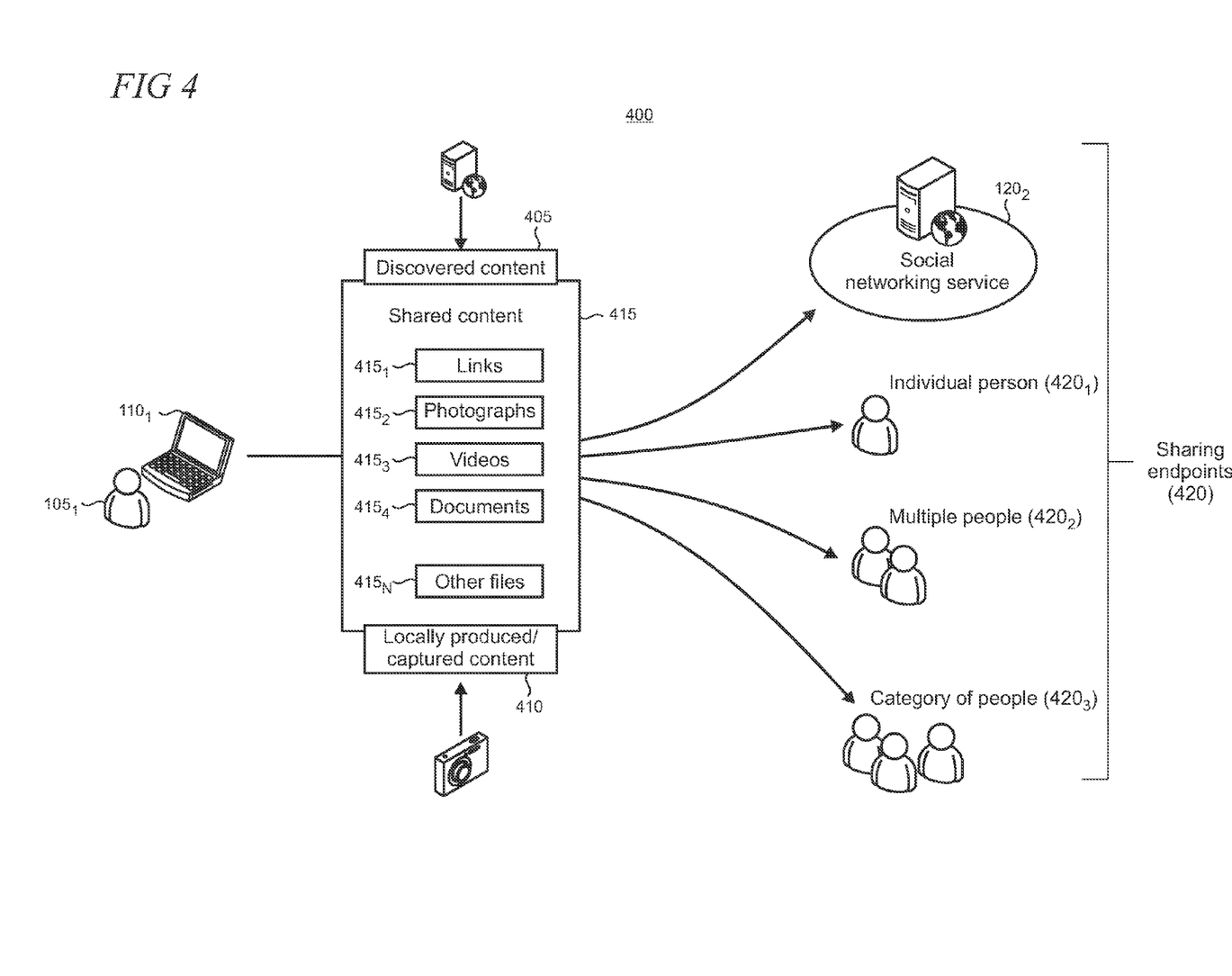
FIG. 4 shows an illustrative arrangement in which discovered content or locally produced/captured content is shared with sharing endpoints as facilitated by the present extensible system action for sharing.

FIG. 4 shows an illustrative arrangement 400 in which discovered content 405 or locally produced/captured content 410 is provided as shared content 415 from the user 105 with sharing endpoints, as collectively identified by reference numeral 420, as facilitated by the operating system 215 and share action $305_1$. For example, discovered content 405 could be identified by the user 105 when surfing the web, while locally produced/captured content 410 could be captured by a digital camera or produced on the computing platform 110 using applications such as a word processor or drawing application. Accordingly, the shared content 415 could include links $415_1$ such as HTML (HyperText Markup Language) links, photographs $415_2$, videos $415_3$, documents $415_4$, and other files of various types as indicated by reference numeral $415_N$.

Figure 5:
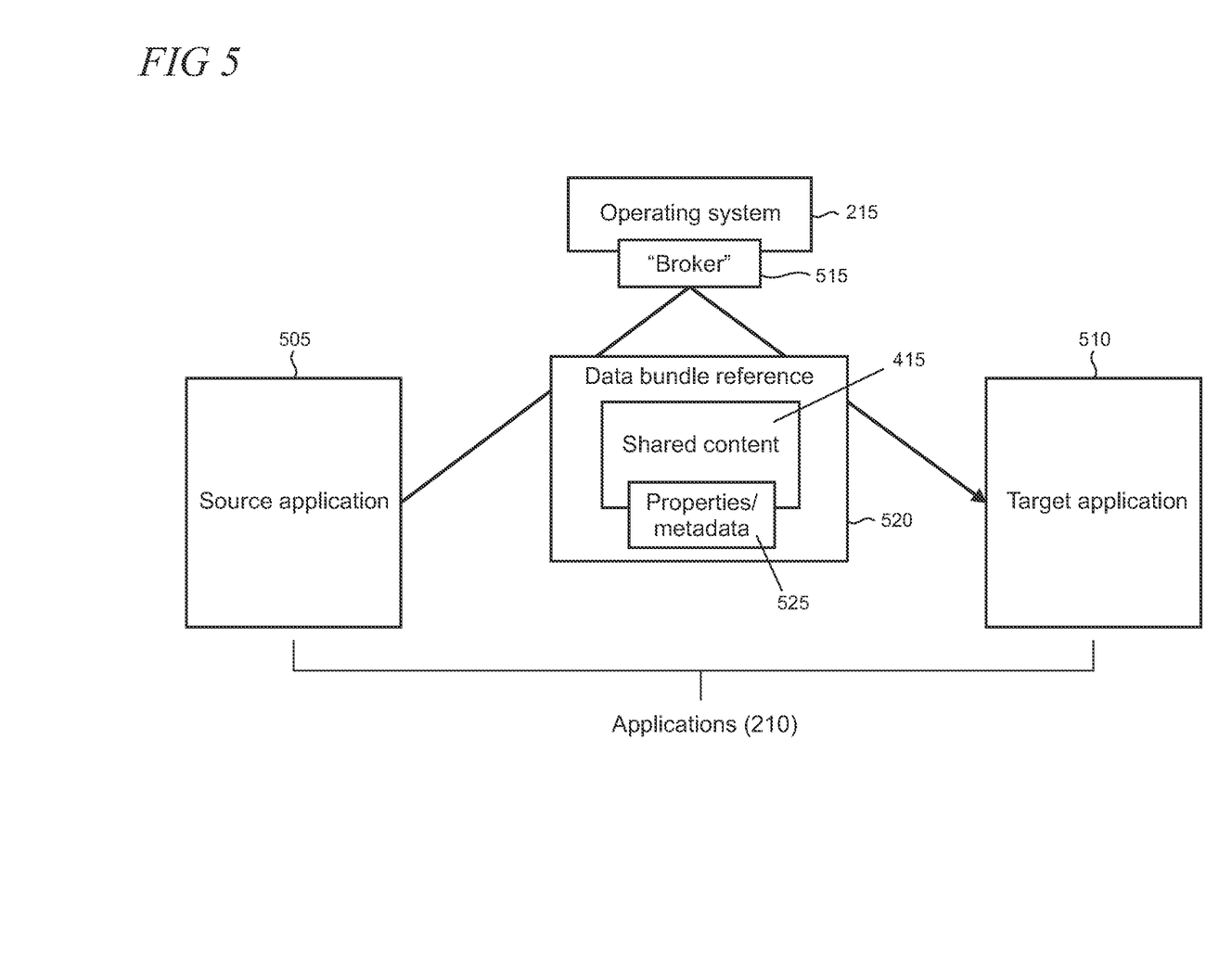
FIG. 5 illustratively depicts how the operating system may act as a broker to facilitate the transfer of a data bundle from a source application to a target application.
Figure 6:
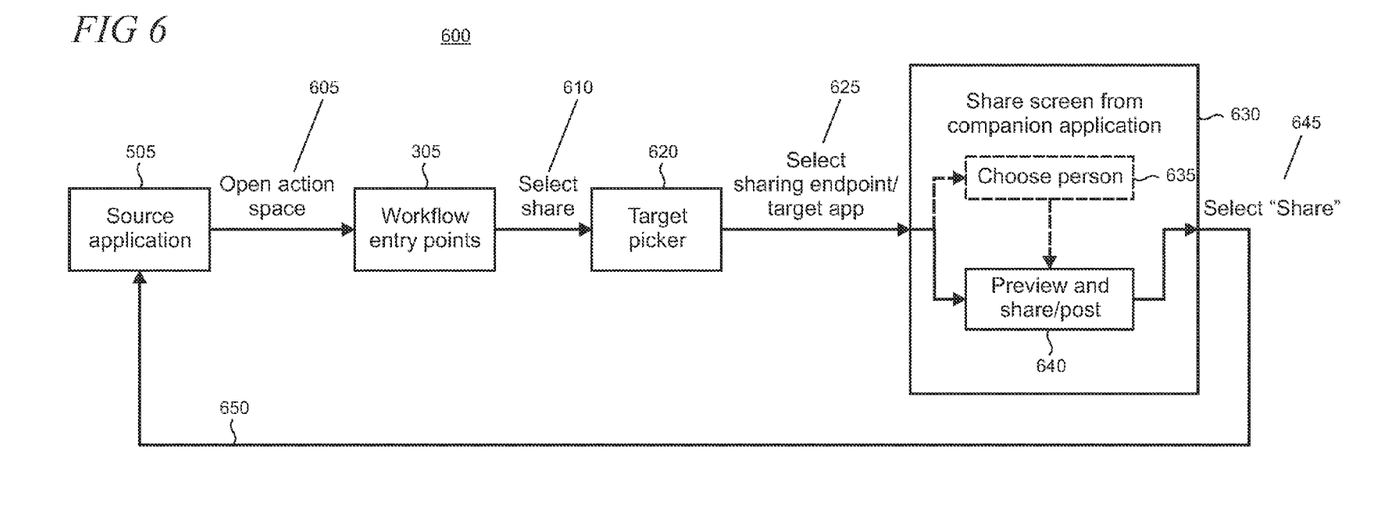
FIG. 6 shows an illustrative share workflow for enabling a user to share content while remaining in context.

As shown in FIG. 5, the applications 210 can include both source applications 505 and target applications 510. Depending on the desires of a given application developer, an application 210 can be a source application 505 as well as a target application 510, be one or the other, or be neither a source application nor a target application. To be a source application 505, an application can simply register that it can provide shareable content in response to the user's choice to share. Such registration may be implemented, for example, as a runtime declaration in which the source application can respectively register and unregister depending on its state at any given instant. For example, in one state, the source application may have content that can be shared, while in another state it lacks such shareable content. In some cases, a source application 505 does not even need to produce the shareable content itself because the operating system 215 can provide content capture using a system option or action such as a screen shot. Target applications 510 will also register the content types they can accept so that a filtered list of target applications can be presented to the user 105 during the course of the share workflow as shown in FIG. 6 and described in the accompanying text. Typically, such registration may occur when the target application 510 is installed on the computing platform 110.

As shown in FIG. 5, the operating system 215 essentially acts as a broker (as indicated by reference numeral 515) via invocation of the share action 305$_1$ to facilitate passing of a reference 520 to the shared content 415 from the source application 505 to the target application 510. Such brokerage advantageously eliminates the need for the source application 505 and the target application 510 to have knowledge of the other. Content sharing can be implemented simply through registration of the shareable content types as described above. In addition, by implementing the sharing as a functionality supported by the operating system, the present share action is native to the computing platform in which the operating system installed and, other than installing sharing applications on the computing platform (which may come preinstalled in some cases), the user typically will not have to install any special programs or engage in complex configuration settings in order to utilize sharing. Furthermore, instantiating the sharing feature in the operating system ensures extensibility to other communication mechanisms that may be developed or implemented in the future so long as they conform to the present sharing paradigm.

In this illustrative example, the shared content 415 is referred to by a data bundle reference 520 so that properties and/or metadata (indicated by reference numeral 525) associated with the shared content 415 may also be passed to the target application 510. Such property/metadata 525 may include, for example, the title of the linked webpage or other descriptive data. The reference 520 is received by the operating system 215 and passed to the target application 510 which then reads the data bundle.

FIG. 6 shows an illustrative share workflow 600 for enabling the user 105 (FIG. 1) to share content while remaining in context without the need to switch to another application. When working with a source application 505, the user 105 can open the action space, as indicated by reference numeral 605, in order to expose the consistent entry points to workflows 305 (as shown in FIG. 3 and described in the accompanying text) to the user. In some cases, the action space may be opened using a dedicated hardware key, for example, while in other cases the action space may be opened using a software command, using a predefined gesture such as a finger swipe on a predefined portion of a touchscreen on a computing platform, or it may be automatically opened via an action of a sharing application when it detects that sharing might be desired by the user 105. The action space will typically graphically display the available system actions, including the share action in this example. The source application 505 may be optionally configured in some cases to enable the user 105 to explicitly specify content to be shared. However, it is noted that such optional configuration may not often be needed because it may be expected that the shared content exposed by the source application can be readily identified without an explicit action from the user 105. In some cases, for example, the user's interaction with the source application 505 will provide sufficient context by itself to enable accurate shared content identification.

In an alternative implementation, a share button can be hosted by a source application. In this case, sharing can be initiated by the user 105 from within that source application rather than through use of the action space of consistent entry points supported by the operating system.

When the user selects the share action, as indicated by reference numeral 610, a target picker 620 is exposed so that the user 105 can specify a sharing end point 420 (FIG. 4). Typically, the user can specify a sharing endpoint by picking a selection from a displayed list of shortcuts (as described in more detail below) and target applications 510 (FIG. 5), as indicated by reference numeral 625. The shortcuts and target applications 510 are filtered by the operating system 215 so that only shortcuts and target applications that are registered to receive the content type provided by the source application 505 are displayed on the target picker 620.

Figure 7:
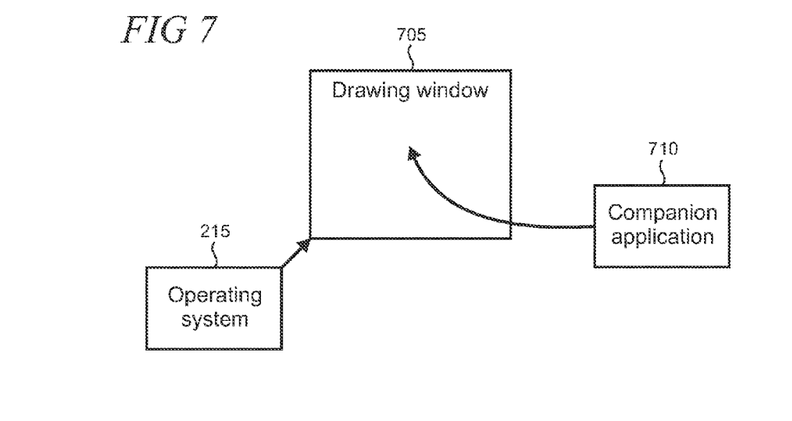
FIG. 7 shows an illustrative window in which a companion application may draw its user interface ("UI")

When the user 105 selects the sharing shortcut/target application, the target application 510 will launch its companion application that will present a share screen 630 (i.e., UI) to the user. As shown in FIG. 7, the operating system 215 will provide a drawing window 705 in which the companion application (indicated by reference numeral 710) can draw its UI. Enabling the target application to draw its own UI through the companion application 710 can be expected to further enhance the extensibility of the present share action to future communication applications and mechanisms. In many typical implementations of the share action, the companion application 710 is configured as small, lightweight and focused application that operates quickly with little impact on system resources.

Returning to FIG. 6, the share screen 630 may provide a preview of the shared content to the user 105 and UI control objects (collectively indicated by reference numeral 640) that may be utilized, for example, to enable the user to execute the sharing or, in some cases provide annotations, comments, or other input to accompany the shared content.

Optionally, as indicated by reference numeral 635, the share screen 630 may also expose an interface to enable the user 105 to choose a particular person to receive the shared content.

When the user executes the sharing of the content, as indicated by reference numeral 645, the share screen 630 provided by the companion application is collapsed and the workflow control is returned to the source application 505, as indicated by reference numeral 650. Thus, the present share action enables the user 105 to take a few simple steps to share content without having to leave the context provided by the source application 505.

Figure 8:
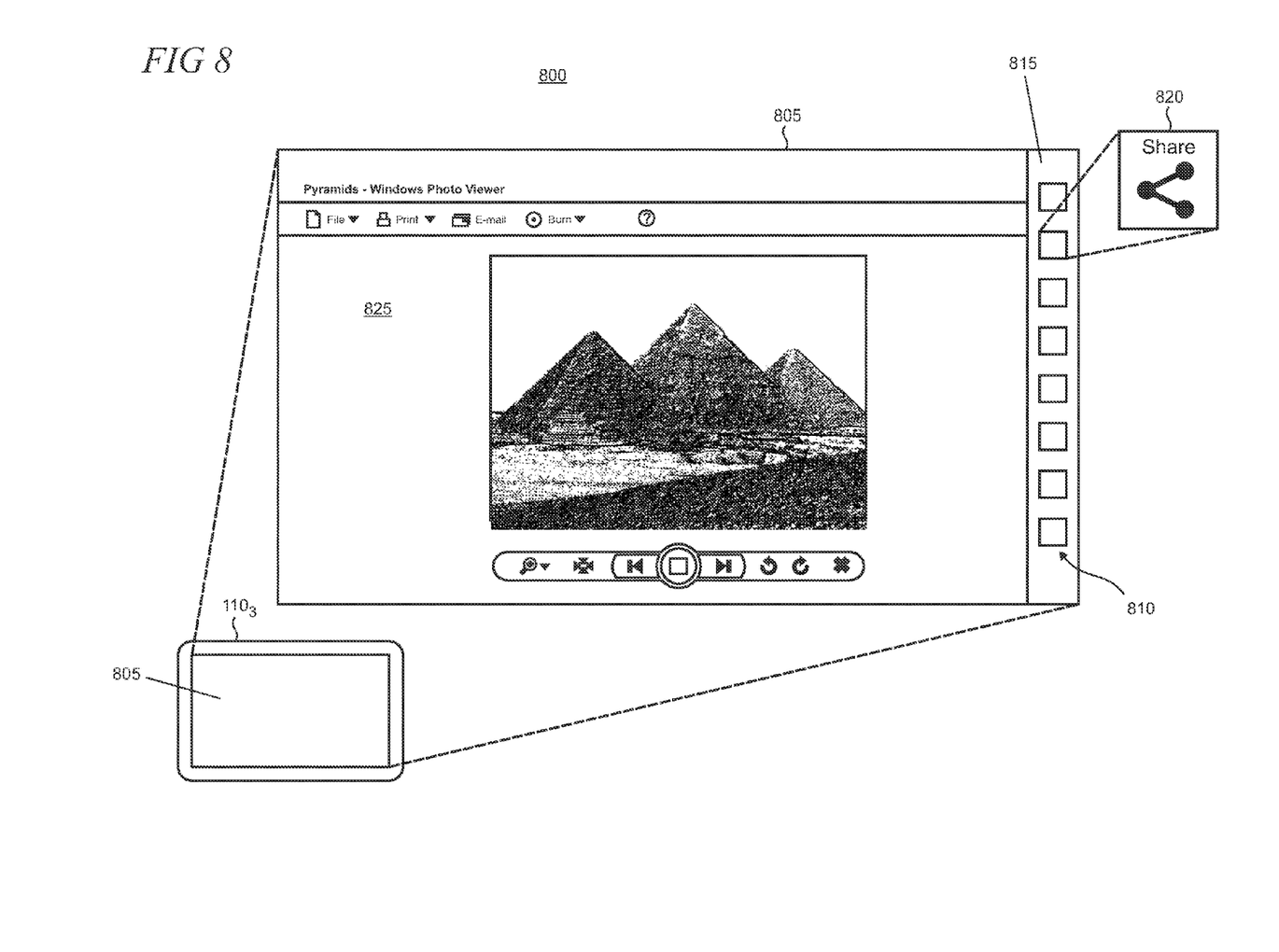
FIG. 8 shows an illustrative UI executing on a computing platform where the UI includes a set of icons arranged in an action space for launching a set of system actions, one of which is a share action.

FIG. 8 shows an illustrative UI 800 supported on a display screen 805 of a tablet computer 110$_3$. While a tablet computer is illustratively shown, it is noted that the UI for other devices could be expected to appear and function in a substantially similar way. The UI 800 includes a set of icons 810 arranged in an action space 815 for launching a set of system actions, one of which is a share action that may be invoked by the user through manipulation of button 820. In this example, as shown, the action space 815 is located along the right edge of the UI window. However other configurations for the action space may also be utilized according to the needs of a particular implementation. In this example, the user 105 is interacting with a source application 505 that implements an image viewer using a viewer window 825. The viewer window 825 shows a photograph of a group of pyramids which thus represents the content that the user 105 wishes to share.

Figure 9:
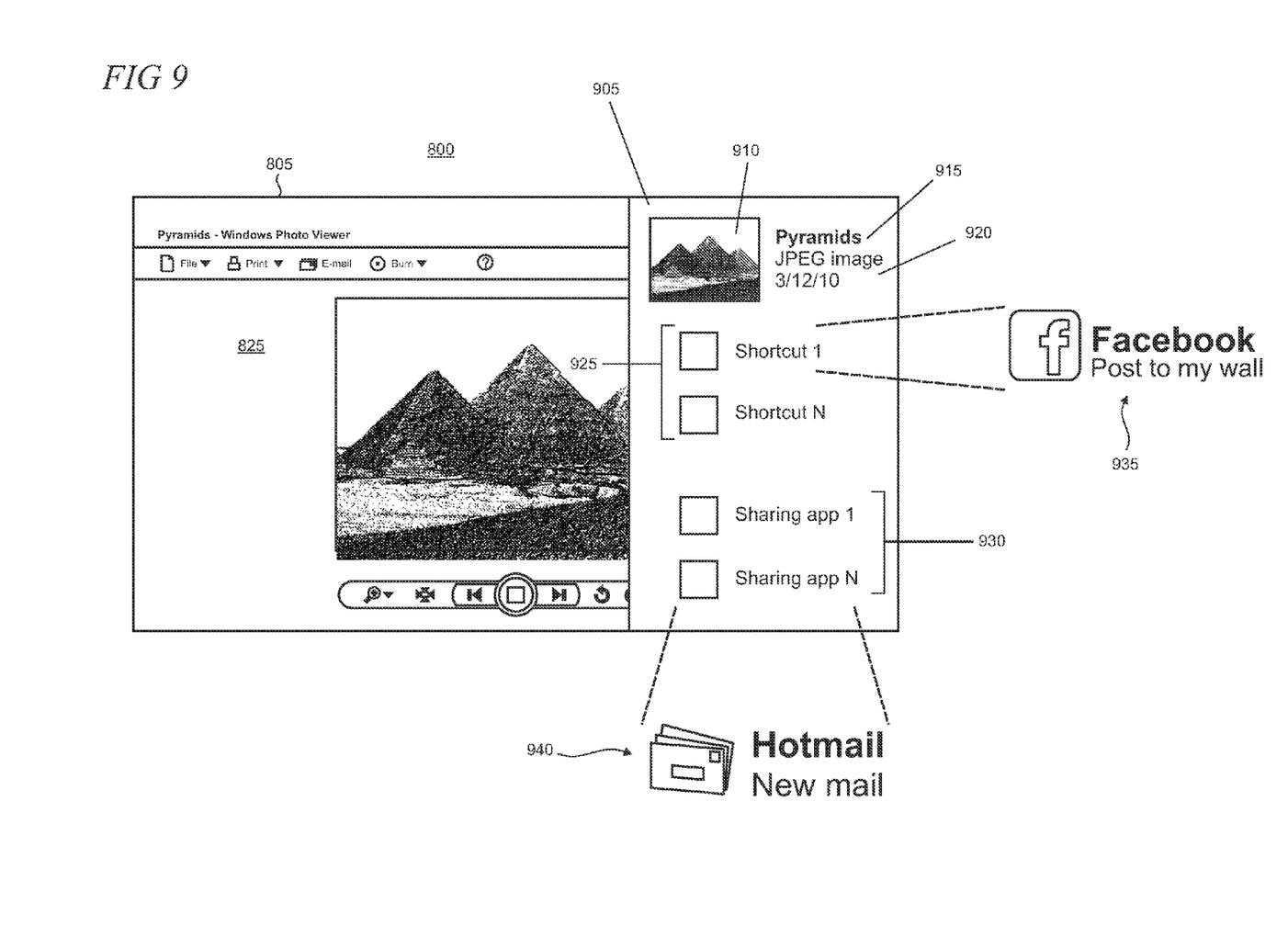
FIG. 9 shows an illustrative UI provided by the system action for sharing.

When the share button 820 is actuated from the action space 815, the target picker is displayed on the UI 800 as indicated by reference numeral 905 in FIG. 9. As with the action space 815 (FIG. 8), a graphical configuration of the target picker 905 can vary from what is illustrated. In this example, a thumbnail 910 is displayed to provide a visual confirmation to the user 105 of the selected content to be shared. Additional information may also be displayed such as a content title 915 and descriptive information or metadata as indicated by reference numeral 920.

The target picker 905 also displays a list of shortcuts indicated by reference numeral 925 and a list of sharing applications indicated by reference numeral 930. The presentation of the shortcuts in sharing applications can vary but may typically include an icon and some associated descriptive text. For example, shortcut 935 (shown in an enlarged view in FIG. 9) represents a share action that the user 105 has taken in the past by sharing content that is posted to the user's wall on a social networking site such as Facebook. Similarly, a sharing application 940 (shown in an enlarged view in FIG. 9) represents a share action that the user 105 can take to send the selected content to a sharing endpoint using e-mail, which in this case is supported by the Hotmail application. The Facebook and Hotmail target applications are displayed in the target picker 905 because they have registered as being capable of receiving photo content. By comparison, a target application that is not capable of receiving photo content (for example, a text-based instant messaging application) would not be displayed by the target picker 905 in this illustrative example.

Figure 10:
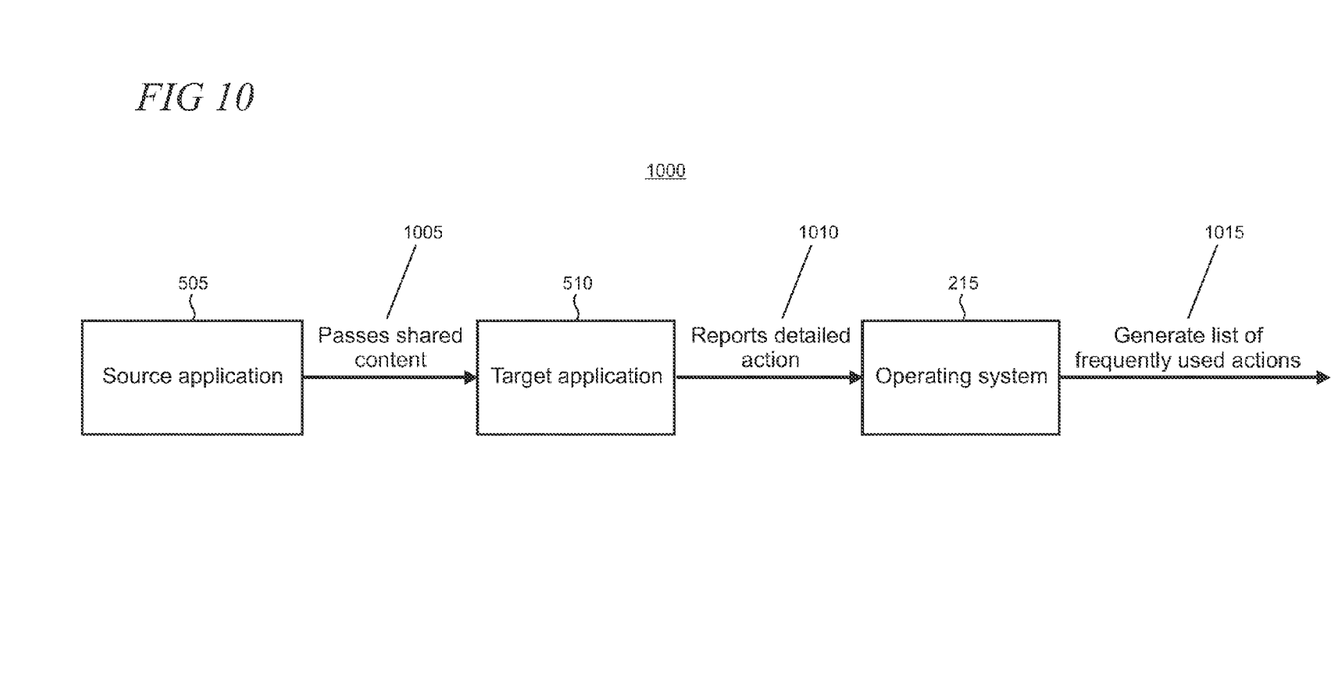
FIG. 10 shows an illustrative workflow associated with a sharing shortcut.

FIG. 10 shows an illustrative workflow 1000 associated with one of the sharing shortcuts 925 (FIG. 9). Here, the source application 505 passes shared content to the target application 510, as indicated by reference numeral 1005. The target application 510 will in turn report a detailed action about the user's action to the operating system 215, as indicated by reference numeral 1010. The operating system will use the reporting from the target application 510 in order to generate a list of frequently used actions, as indicated by reference numeral 1015, which may then be used for the sharing shortcuts 925.

Figure 11:
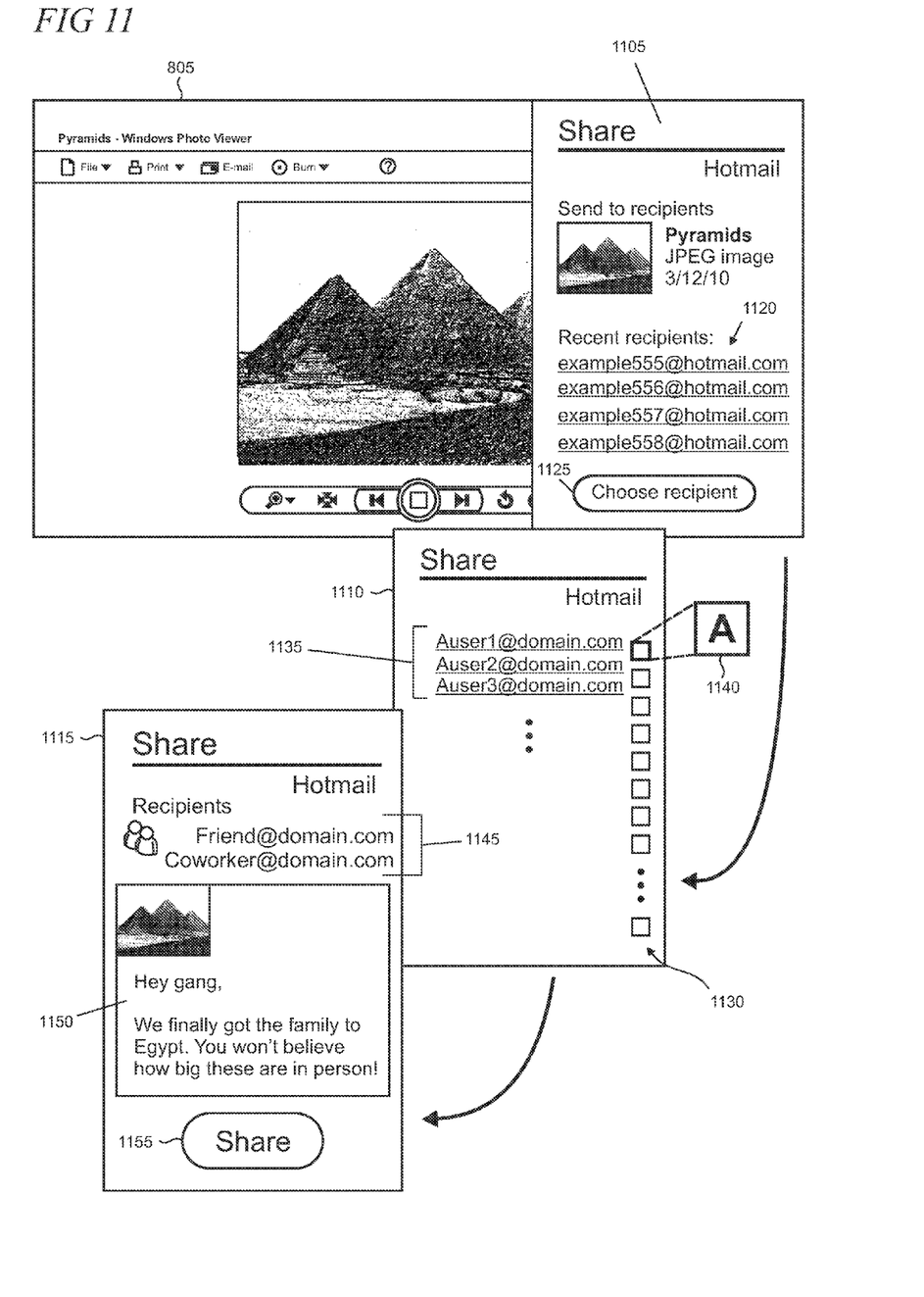
FIG. 11 shows various UI screens supported by a companion application that is launched to facilitate content sharing.

FIG. 11 shows a series of UI screens 1105, 1110, and 1115 supported by the companion application to the Hotmail application shown in FIG. 9. The companion application is launched when the icon 940 is selected by the user 105 (FIG. 1) and first displays UI screen 1105 to expose a list of recipients 1120 that the user 105 has recently e-mailed. If the intended sharing endpoint is not shown in the list 1120, then the user 105 can actuate button 1125 to pull up the user's Hotmail address book shown in the UI screen 1110. In this example, the address book includes the typical icons 1130 to enable the user to locate e-mail addresses alphabetically. Accordingly, a number of e-mail addresses 1135 are displayed which, in this case are associated with the letter "A" 1140, as shown in an enlarged view. By working through the address book, the user 105 can pick recipients for the shared content which are confirmed in the UI screen 1115, as indicated by reference numeral. The companion application may support additional interfaces to enable the user 105 to provide annotations, comments, or other input to accompany the shared content. In this case as indicated by reference numeral 1150, the user 105 has input a short note into a text entry window that is provided by the companion application.

Figure 12:
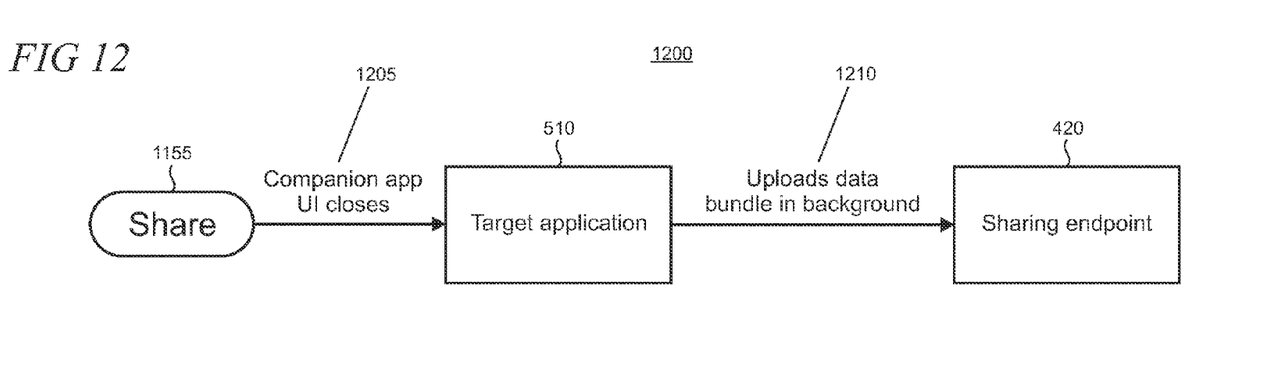
FIG. 12 shows a workflow associated with uploading performed by the target application as a background process.

When the user 105 is ready to share the content, the user can actuate the share button 1155 to complete the share action. As shown in the workflow 1200 depicted in FIG. 12, upon actuation of the share button 1155, the UI supported by the companion application closes (as indicated by reference numeral 1205) and the target application 510 will upload the data bundle associated with the shared content to the selected sharing endpoint 420 typically as a background process (as indicated by reference numeral 1210).

Figure 13:
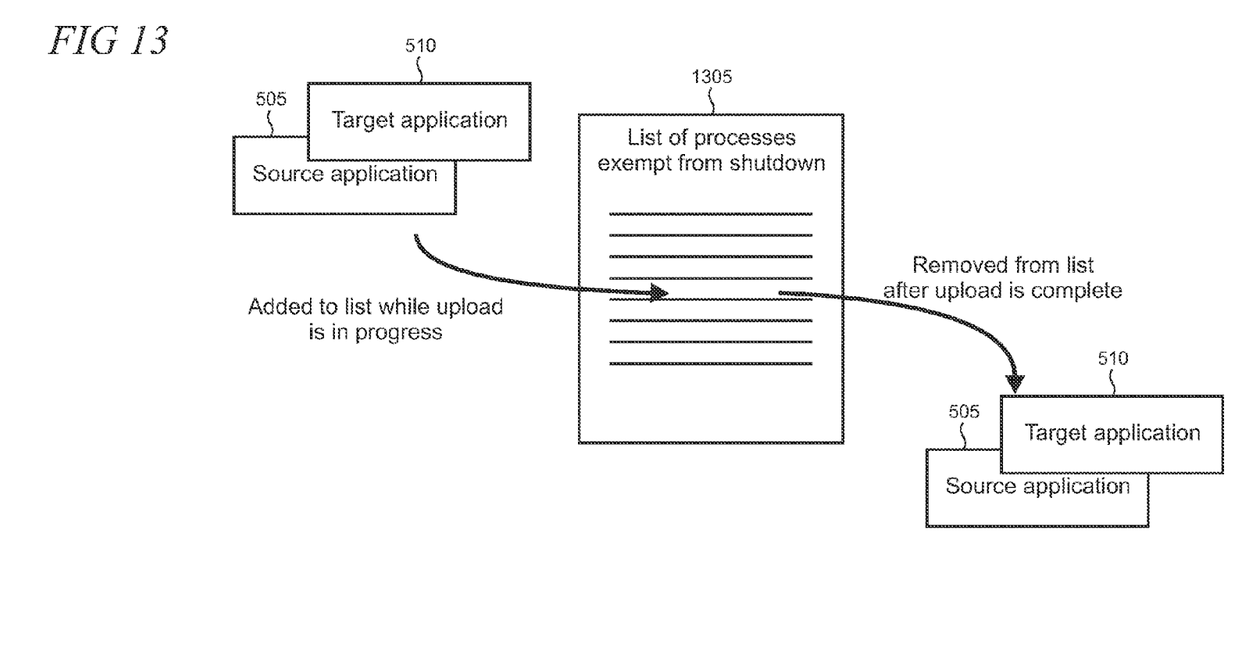
FIG. 13 shows an illustrative method by which the operating system adds the target application to a list of processes that are exempt from being shut down.

By implementing the uploading as a background process, the user 105 can quickly be returned back to the source application 505 (FIG. 5) so that context of the user experience associated with the source application is maintained. As shown in FIG. 13, in order to ensure that the background uploading is completed to thus meet the expectations of the user 105 with regard to the behavior of the share action, the identity of a target application 510 that is currently engaged in uploading to a sharing endpoint 420 is added to a list 1305 of processes that are exempt from shutdown via action of the operating system 215. The associated source application 505 may also be added to the list 1305. For example, if the target application 510 is reading a large data bundle, it is not interrupted by having the source application get shut down prematurely. The source application 505 and target application 510 are removed from the list 1305 when the uploading is complete.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. At least one computer-readable storage media that is an article of manufacture and that stores instructions that, when executed by a computing device that includes an operating system, a source application, and a target application, cause the computing device to perform actions comprising:
   executing, by the computing device, the operating system;
   receiving, by the executing operating system, an indication of a share action, where the share action eliminates a requirement for switching from the source application to some other functionality for sharing content with the target application, where the operating system is configured for brokering, via the share action, the sharing of the content between the source application and the target application, and where the brokering by the operating system eliminates a need for the source application and the target application to have knowledge of each other;
   uploading, as a background process subsequent to receiving the indication, a data bundle associated with the share action; and
   identifying, subsequent to receiving the indication and until the uploading is completed, the source application and the target application as exempt from shutdown via action of the operating system.

2. The at least one computer-readable storage media of claim 1, the actions further comprising registering a sharable content type of the content.

3. The at least one computer-readable storage media of claim 1 where the share action is native to the computing device via the operating system.

4. The at least one computer-readable storage media of claim 1 where the sharing comprises receiving, by the operating system, a reference from the source application, where the reference refers to the content.

5. The at least one computer-readable storage media of claim 4 where the reference further refers to properties or metadata associated with the content.

6. The at least one computer-readable storage media of claim 4 where the sharing further comprises passing, by the operating system, the received reference to the target application.

7. The at least one computer-readable storage media of claim 1 where the computing device is configured for coupling to social networking sites.

8. A method performed on a computing device that includes an operating system, a source application, and a target application, the method comprising:
   executing, by the computing device, the operating system;

receiving, by the executing operating system, an indication of a share action, where the share action eliminates a requirement for switching from the source application to some other functionality for sharing content with the target application, where the operating system is configured for brokering, via the share action, the sharing of the content between the source application and the target application, and where the brokering by the operating system eliminates a need for the source application and the target application to have knowledge of each other;

uploading, as a background process subsequent to receiving the indication, a data bundle associated with the share action; and identifying, subsequent to receiving the indication and until the uploading is completed, the source application and the target application as exempt from shutdown via action of the operating system.

9. The method of claim 8 further comprising registering a sharable content type of the content.

10. The method of claim 8 where the share action is native to the computing device via the operating system.

11. The method of claim 8 where the sharing comprises receiving, by the operating system, a reference from the source application, where the reference refers to the content.

12. The method of claim 11 where the reference further refers to properties or metadata associated with the content.

13. The method of claim 11 where the sharing further comprises passing, by the operating system, the received reference to the target application.

14. A system comprising a computing device and at least one program that includes an operating system, a source application, and a target application, where the computing device and the at least one program module that are together configured for performing actions comprising:

executing, by the computing device, the operating system;

receiving, by the executing operating system, an indication of a share action, where the share action eliminates a requirement for switching from the source application to some other functionality for sharing content with the target application, where the operating system is configured for brokering, via the share action, the sharing of the content between the source application and the target application, and where the brokering by the operating system eliminates a need for the source application and the target application to have knowledge of each other;

uploading, as a background process subsequent to receiving the indication, a data bundle associated with the share action; and identifying, subsequent to receiving the indication and until the uploading is completed, the source application and the target application as exempt from shutdown via action of the operating system.

15. The system of claim 14, the actions further comprising registering a sharable content type of the content.

16. The system of claim 14 where the share action is native to the computing device via the operating system.

17. The system of claim 14 where the sharing comprises receiving, by the operating system, a reference from the source application, where the reference refers to the content.

18. The system of claim 17 where the reference further refers to properties or metadata associated with the content.

19. The system of claim 17 where the sharing further comprises passing, by the operating system, the received reference to the target application.

20. The system of claim 14 where the computing device is configured for coupling to social networking sites.

* * * * *